US011438206B2

(12) United States Patent
Zou (10) Patent No.: US 11,438,206 B2
(45) Date of Patent: Sep. 6, 2022

(54) MULTIPLE SUBCARRIERS MODULATOR, BACKSCATTER DEVICE AND HUB DEVICE IN A BACKSCATTER COMMUNICATION SYSTEM

(71) Applicant: Telefonaktiebolaget LM Ericsson (publ), Stockholm (SE)

(72) Inventor: Gang Zou, Lund (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 0 days.

(21) Appl. No.: 17/311,728

(22) PCT Filed: Dec. 18, 2018

(86) PCT No.: PCT/EP2018/085691
§ 371 (c)(1),
(2) Date: Jun. 8, 2021

(87) PCT Pub. No.: WO2020/125959
PCT Pub. Date: Jun. 25, 2020

(65) Prior Publication Data
US 2022/0029871 A1    Jan. 27, 2022

(51) Int. Cl.
*H04L 27/26*    (2006.01)
*H04B 1/40*    (2015.01)

(52) U.S. Cl.
CPC ........... *H04L 27/2627* (2013.01); *H04B 1/40* (2013.01)

(58) Field of Classification Search
CPC .............................. H04L 27/2627; H04B 1/40
See application file for complete search history.

(56) References Cited

U.S. PATENT DOCUMENTS

| 5,640,683 | A |   | 6/1997  | Evans et al. |            |
|-----------|---|---|---------|--------------|------------|
| 6,130,623 | A | * | 10/2000 | MacLellan    | H04L 9/3271 |
|           |   |   |         |              | 340/5.1    |

(Continued)

FOREIGN PATENT DOCUMENTS

| EP | 0853392 A2 * | 7/1998  | .............. H04B 7/22 |
| EP | 0853392 A2   | 7/1998  |                          |
| WO | 2018187737 A1 | 10/2018 |                         |

OTHER PUBLICATIONS

Vanucci, G., et al., "A Software-Defined Radio System for Backscatter Sensor Networks", IEEE Transactions on Wireless Communications, Jun. 1, 2008, pp. 2170-2179, vol. 7, No. 6.

(Continued)

*Primary Examiner* — Jaison Joseph
(74) *Attorney, Agent, or Firm* — Coats & Bennett, PLLC (57) ABSTRACT

A multiple subcarriers modulator (200) for a backscatter device comprised in a backscatter communication system is disclosed. The multiple subcarriers modulator comprises an antenna switch (210) and an impedance matrix (220) comprising a number of impedances. The multiple subcarriers modulator further comprises a first modulator (230) configured to generate a first modulated signal by modulating a first data stream with a first subcarrier having a first frequency and a second modulator (240) configured to generate a second modulated signal by modulating a second data stream with a second subcarrier having a second frequency. The multiple subcarriers modulator further comprises a summing circuit (250) configured to generate a control signal by combining the first and second modulated signals and a switch controller (270) configured to control the antenna switch such that one of the impedance in the impedance matrix is connected to an antenna based on the control signal.

15 Claims, 7 Drawing Sheets

(56) References Cited

U.S. PATENT DOCUMENTS

| | | | | |
|---|---|---|---|---|
| 6,438,258 | B1* | 8/2002 | Brock-Fisher | G01S 7/52038 |
| | | | | 382/128 |
| 10,067,228 | B1* | 9/2018 | Steenstrup | G01S 7/521 |
| 2006/0220794 | A1 | 10/2006 | Zhu | |
| 2007/0194932 | A1* | 8/2007 | Oishi | H04B 1/525 |
| | | | | 340/572.7 |
| 2013/0299579 | A1 | 11/2013 | Manku | |
| 2016/0189492 | A1* | 6/2016 | Hamam | G06F 3/016 |
| | | | | 340/407.1 |
| 2017/0364154 | A1* | 12/2017 | Levesque | G06F 1/1652 |
| 2017/0373892 | A1* | 12/2017 | Ganesan | H04B 1/0475 |
| 2018/0375703 | A1* | 12/2018 | Kellogg | H04L 5/0007 |
| 2020/0096599 | A1* | 3/2020 | Hewett | G06Q 20/203 |
| 2020/0209020 | A1* | 7/2020 | Issa | G01B 11/18 |
| 2021/0350197 | A1* | 11/2021 | Chow | G06K 19/0723 |

OTHER PUBLICATIONS

Naderiparizi, S., et al., "Towards Battery-Free HD Video Streaming", NSDI'18: Proceedings of the 15th USENIX Conference on Networked Design and Implementation, Apr. 9, 2018, pp. 233-247.

Rajoria, N., et al., "Multi-Carrier Backscatter Communication System for Concurrent Wireless and Batteryless Sensing", 2017 International Conference on Wireless Communications, Signal Processing and Networking (WiSPNET), Mar. 22-24, 2017, pp. 1078-1082, Chennai, India.

Franco, S., "Operational Amplifier Fundamentals", Design with Operational Amplifiers and Analog Integrated Circuits, 3rd Ed., Jan. 1, 2002, pp. 16-17, Chapter 1.

\* cited by examiner

MULTIPLE SUBCARRIERS MODULATOR, BACKSCATTER DEVICE AND HUB DEVICE IN A BACKSCATTER COMMUNICATION SYSTEM

TECHNICAL FIELD

Embodiments herein relate to a multiple subcarriers modulator, a backscatter device and a hub device in a backscatter communication system. In particular, the embodiments relate to a multiple subcarriers modulator for a backscatter device for increasing data throughput and a hub device for receiving data modulated on multiple subcarriers.

BACKGROUND

Radio backscatter technique is becoming a key technology for low-power wireless communication systems. In a backscatter communications system, a backscatter transmitter in a backscatter device modulates and reflects received radio frequency (RF) signals to transmit data instead of generating RF signals by itself. This results low-cost implementation and low-power consumption of the backscatter device.

So backscatter technique is a promising solution for a short-range peer-to-peer communication which has constrain on power consumption. One application example is a body network for wearable devices as discussed in S. Naderiparizi, et. al. "*Towards Battery-Free HD Video Streaming*", an article from University of Washington. The article presents a novel architecture that enables HD video streaming from a low-power, wearable camera to a nearby mobile device. To achieve this, they present an "analog" video backscatter technique that feeds analog pixels from the photo-diodes directly to the backscatter hardware, thereby eliminating power-consuming hardware components, such as analog-to-digital converters (ADCs) and codecs.

Conventional backscatter transmitter is normally designed with a singular subcarrier modulation to avoid in-band interference, for example, as disclosed in the article mentioned above and in G. Vannucci, A. Bletsas, and D. Leigh, "*A software-defined radio system for backscatter sensor networks*," IEEE Transactions on Wireless Communications, vol. 7, no. 6, Jun. 2008, pp. 2170-2179. Due to limitations of RF power and bandwidth, the conventional backscatter transmitter cannot be widely applied for data-intensive wireless communications.

SUMMARY

It is therefore an object of embodiments herein to provide an improved technique and apparatus for generating and receiving backscattered signal in a backscatter communication system.

According to a first aspect of embodiments herein, the object is achieved by a multiple subcarriers modulator for a backscatter device comprised in a backscatter communication system. The multiple subcarriers modulator comprises an antenna switch and an impedance matrix comprising a number of impedances. The multiple subcarriers modulator further comprises a first modulator configured to generate a first modulated signal by modulating a first data stream with a first subcarrier having a first frequency and a second modulator configured to generate a second modulated signal by modulating a second data stream with a second subcarrier having a second frequency. The multiple subcarriers modulator further comprises a summing circuit configured to generate a control signal by combining the first and second modulated signals and a switch controller configured to control the antenna switch such that one of the impedance in the impedance matrix is connected to an antenna based on the control signal.

According to a second aspect of embodiments herein, the object is achieved by a hub device comprised in a backscatter communication system. The hub device comprises an antenna and a power amplifier for generating a signal with a carrier frequency for radiating by the antenna. The hub device further comprises a power splitter for splitting the carrier frequency signal and a receiver. The receiver comprises a band-pass filter configured to filter a backscattered signal received from a backscatter device and generate a filtered signal. The backscattered signal comprises a first and a second data streams modulated on a first and second subcarriers respectively. The receiver further comprises an amplifier configured to amplify the filtered signal and generate an amplified signal and a mixer configured to down-convert the amplified signal to a baseband signal by mixing the amplified signal with a signal generated from the power splitter. The receiver further comprises a low-pass filter configured to filter the baseband signal and generate a filtered baseband signal and two-comparators configured to extract bit streams from the filtered baseband signal. The hub device further comprises a baseband processor comprising a look-up table to extract the first dada stream and the second data stream from the bit streams.

According to a third aspect of embodiments herein, the object is achieved by a backscatter device comprising the multiple subcarriers modulator as described above.

According to a fourth aspect of embodiments herein, the object is achieved by a backscatter communication system comprising the hub device and the backscatter device as described above.

According to the embodiments herein, to increase data throughput, a backscatter device having data modulated with multiple subcarriers is provided. For example, the data throughput from a backscatter device to a hub device may be doubled when data is modulated with dual subcarriers in the backscatter device.

On the hub device side, a look-up table approach is proposed to demodulate received signals backscattered from the backscatter device having data modulated with multiple subcarriers. The demodulation based on the look-up table may greatly simplify demodulation algorithm in baseband processing in the hub device.

Therefore, the embodiments herein provide improved techniques and apparatus for generating and receiving backscatter signals in a backscatter communication system.

BRIEF DESCRIPTION OF THE DRAWINGS

Examples of embodiments herein are described in more detail with reference to attached drawings in which.

DETAILED DESCRIPTION

Figure 1:
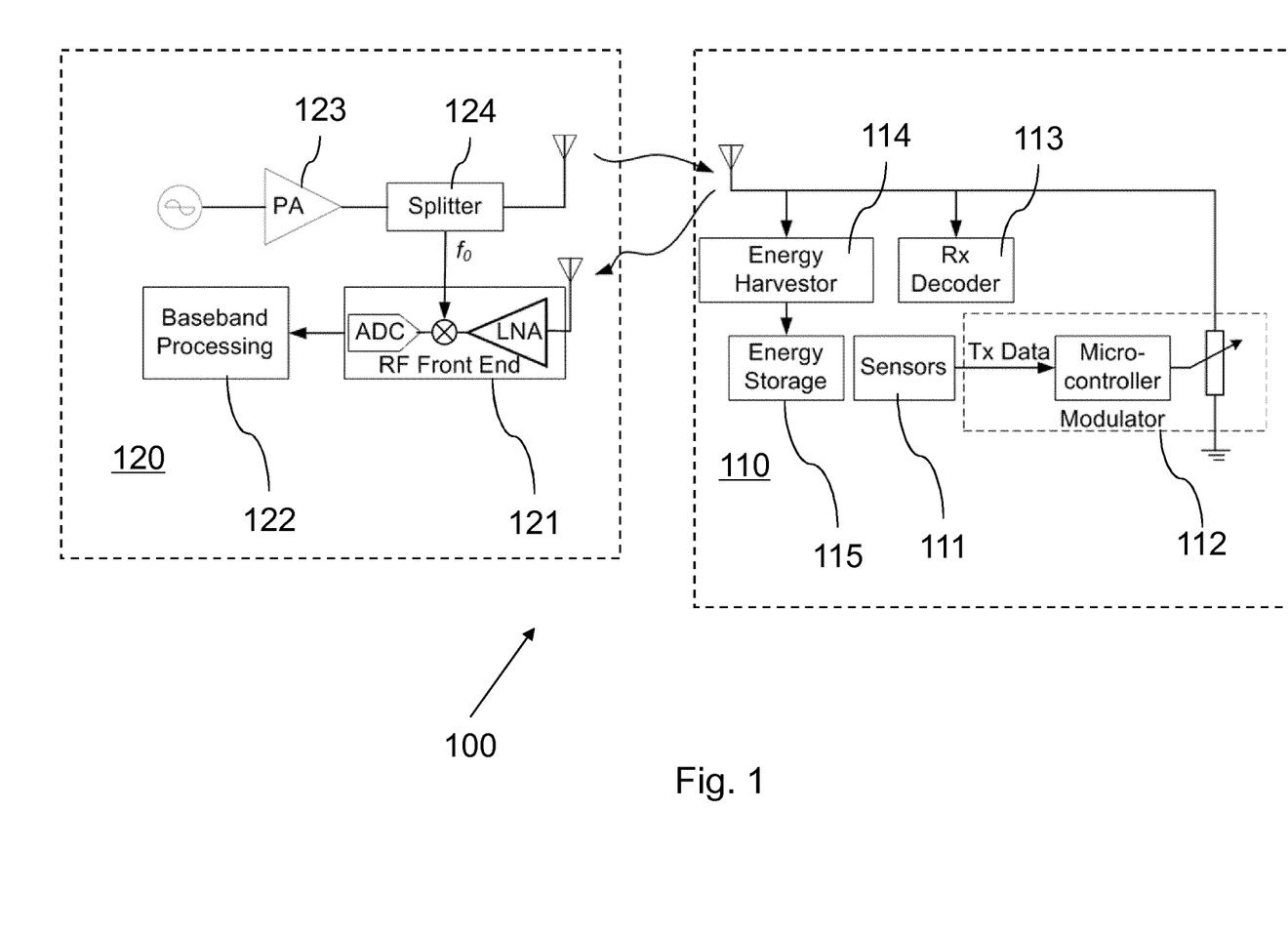
FIG. 1 is a schematic block diagram illustrating embodiments of a backscatter communication system in which embodiments herein may be implemented.

FIG. 1 shows an example of a backscatter communication system 100 in which embodiments herein may be implemented. The backscatter communication system 100 comprises a backscatter device 110 and a hub device 120. The backscatter device 110 may comprise one or more sensors 111 for generating data to be transmitted and a modulator 112 for modulating the data to be transmitted. The backscatter device 110 may further comprise a receiver decoder 113 for receiving RF signals and decoding the received signals, an energy harvester 114 for converting RF signals transmitted from the hub device 120 or other source into direct current (DC) power or energy and an energy storage 115 for storing the converted power.

The hub device 120 may comprise an RF frontend 121 for receiving and converting RF signals to baseband signals, a baseband processing unit 122 for processing and decoding the baseband signals. The hub device 120 may further comprise a power amplifier 123 for amplifying RF signals to a desired power level and a splitter 124 for splitting the RF signals.

The hub device 120 radiates an incident single-tone sinusoidal continuous wave with a frequency of $f_0$. The backscatter device 110 may be a passive node which harvests energy from the wave and modulates and reflects a fraction of the wave back to the hub device 120. The wave reflection is an effect due to an intentional mismatch between its antenna impedance and load impedance. Varying the load impedance makes the reflection coefficient to vary so the reflected wave may be modulated with data to be transmitted.

The reflection coefficient of an antenna with load impedance may be computed by Eq. (1).

$$\Gamma_i = \frac{Z_i - Z_a^*}{Z_i + Z_a} \qquad (1)$$

where $Z_a$ is antenna impedance, * is the complex conjugate operator, and $Z_i$ is the ith load impedance corresponding to an antenna switch in state i to connect the antenna to one of a plurality of impedances.

Figure 2:
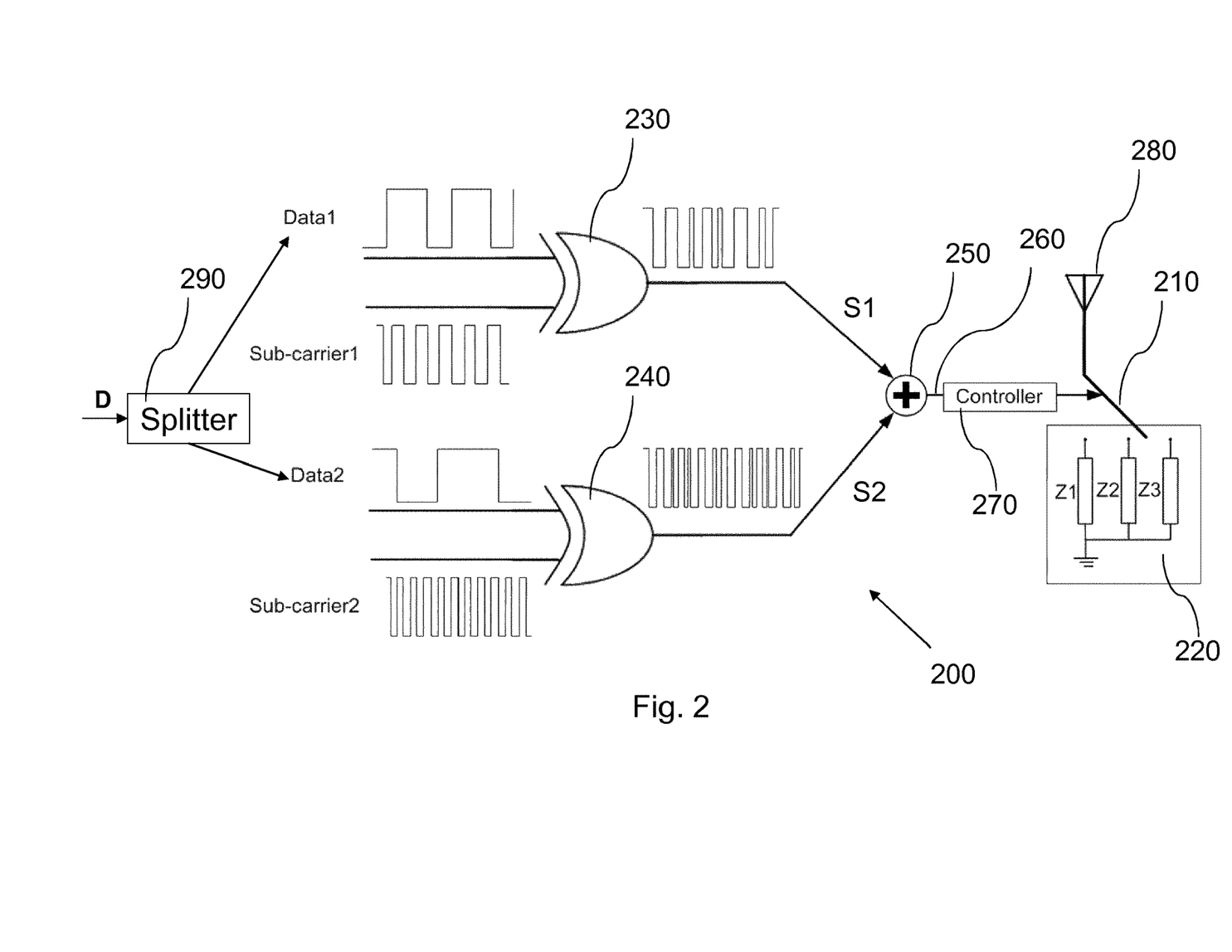
FIG. 2 is a schematic block diagram showing a multiple subcarriers modulator according to embodiments herein.

FIG. 2 shows a modulator 200 for a backscatter device according to the embodiments herein. The modulator 200 comprises an antenna switch 210 and an impedance matrix 220 comprising a number of impedances Z1, Z2, Z3.

The modulator 200 further comprises a first modulator 230 configured to generate a first modulated signal by modulating a first data stream Data1 with a first subcarrier Sub-carrier1 having a first frequency f1.

The modulator 200 further comprises a second modulator 240 configured to generate a second modulated signal by modulating a second data stream Data2 with a second subcarrier Sub-carrier2 having a second frequency f2.

The modulator 200 further comprises a summing circuit 250 configured to generate a control signal 260 by combining the first and second modulated signals.

The modulator 200 further comprises a switch controller 270 configured to control the antenna switch 210 such that one of the impedance in the impedance matrix 220 is connected to an antenna 280 based on the control signal 260.

Although the modulator 200 shown in FIG. 2 comprises dual subcarriers, the number of subcarriers may be further increased to more than two, i.e. the modulator 200 may be a multiple subcarriers modulator.

The two subcarriers are at frequency f1 and f2 respectively. The data to be transmitted may be split into two data streams, i.e. Data1 and Data2, and modulated by the corresponding subcarrier. The two data streams may also be generated from two sensors.

So according to some embodiments, the modulator 200 may further comprise a data splitter 290 configured to split a data stream D to be transmitted to a first and a second data streams.

According to some embodiments herein each of the first and second modulators 230, 240 may be an XOR gate to simplify implementation.

According to some embodiments herein each of the first and second subcarriers may a square wave signal.

So the subcarrier, i.e. a square wave operating at frequency f1, modulates the data to be transmitted by an XOR gate. The data to be transmitted is then up-converted to an up-converted or modulated signal with frequency f1.

Subcarrier modulation with a square wave generates high order harmonics. To avoid the harmonic waves from square waves, the frequency of subcarriers may be selected as f2=2*f1, i.e. the second frequency f2 may be two times of the first frequency f1.

The first and second modulators 230, 240 generate two up-converted or modulated signals S1 and S2 from the two data streams Data1 and Data2. The data streams are binary.

Figure 3:
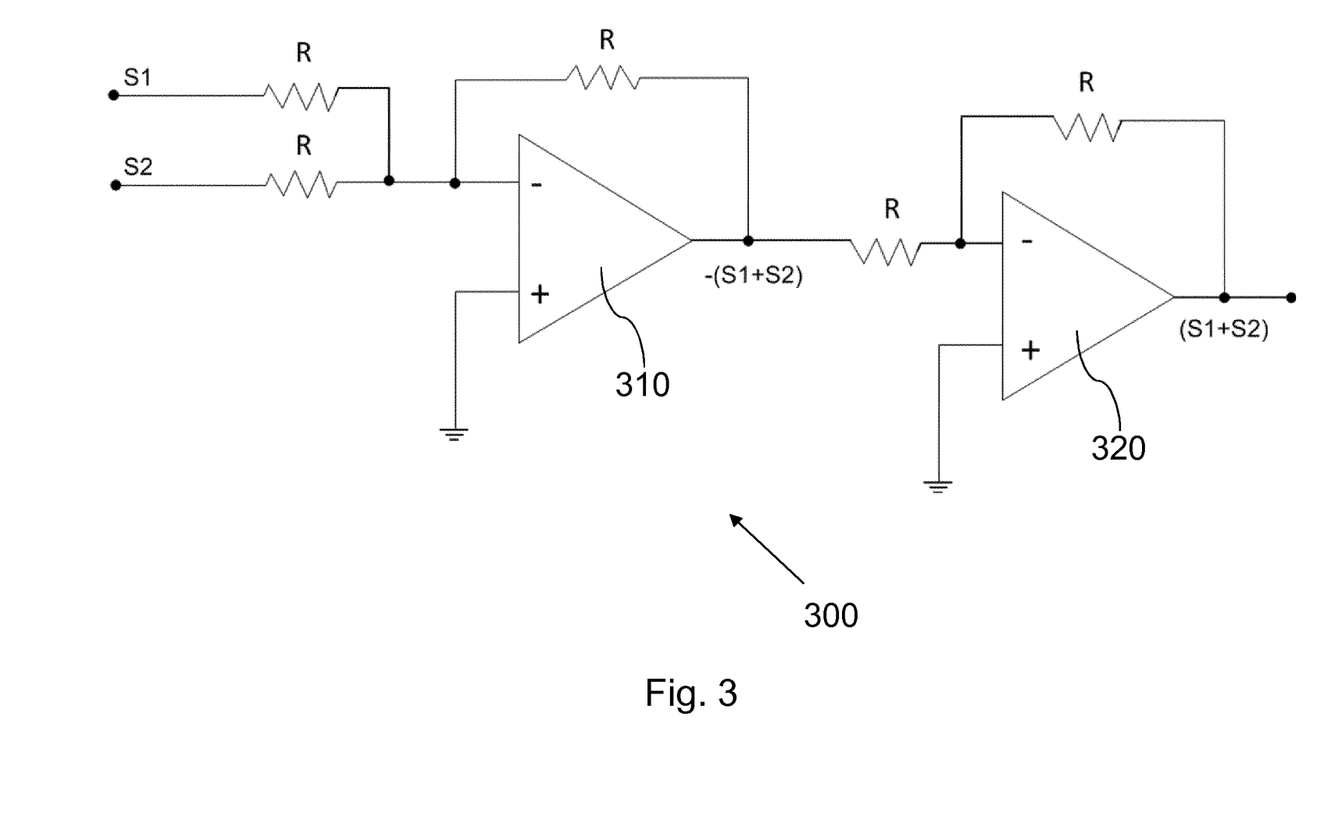
FIG. 3 is a schematic block diagram showing a summing amplifier according to embodiments herein.

According to some embodiments herein, the summing circuit 250 may be a summing amplifier 300 as shown in FIG. 3. The summing amplifier 300 may comprise an operational amplifier 310 to sum the first and second modulated signals S1, S2 and an inverter 320 to invert the summed signal S1+S2.

The two up-converted signals S1, S2 are then added together by the summing circuit 250, for example the summing amplifier 300. The summing result S1+S2, i.e. the control signal 260, is further applied to the switch controller 270 to control the load impedance of the antenna.

According to some embodiments herein, the switch controller 270 may comprise multiple comparators configured to convert the control signal 260 to switch signals for controlling on/off states of the antenna switch 210, thereby controlling the load impedance of the antenna. Since the sum of the two up-converted signals leads to three possible values, the load impedance needs switch among three values Z1, Z2 and Z3.

Figure 4:
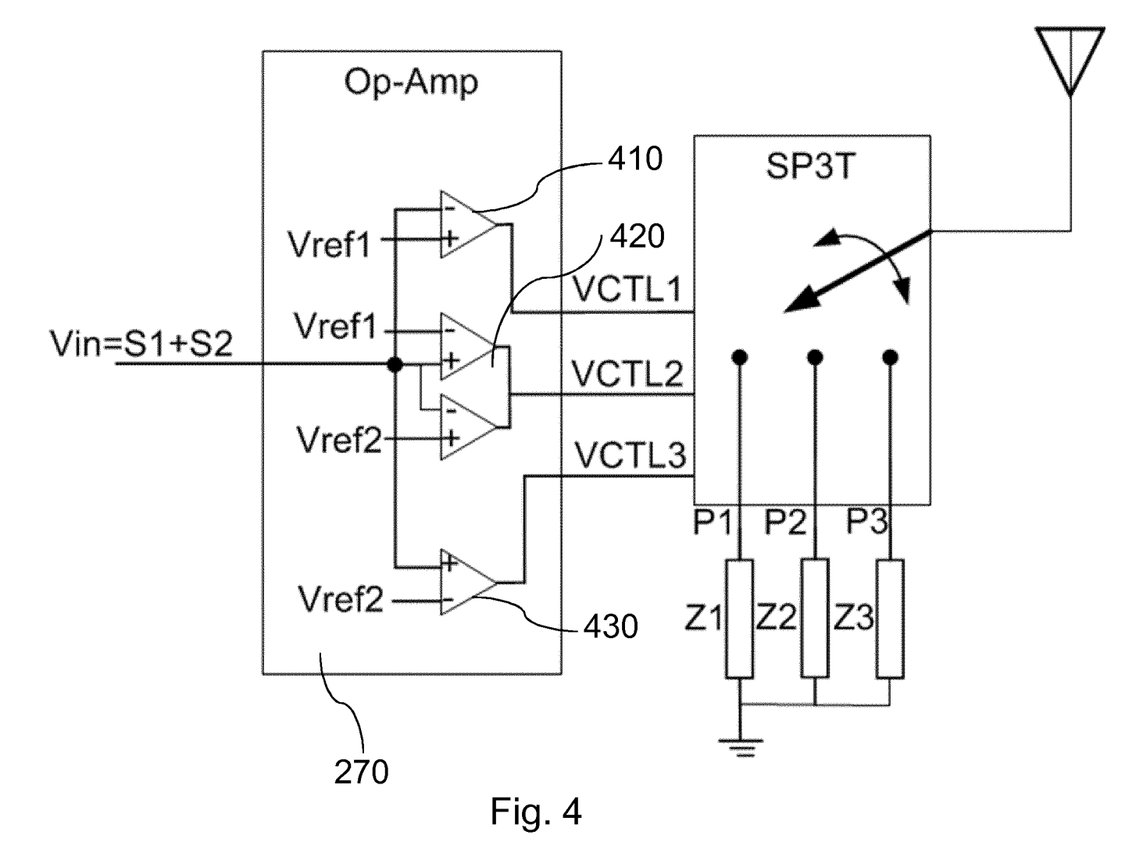
FIG. 4 is a schematic block diagram showing a switch controller and antenna switch according to embodiments herein.

FIG. 4 shows an example embodiment of the switch controller 270. The switch controller 270 may comprises 4 operating amplifiers (Op-Amps) working as comparators. The first comparator 410 is an inverter comparator configured to generate a first control signal VCTL1 from the summed signal Vin=S1+S2. The second comparator 420 is a window comparator configured to generate a second control signal VCTL2 from the summed signal Vin=S1+S2. The third comparator 430 is a non-inverter comparator configured to generate a third control signal VCTL3 from the summed signal Vin=S1+S2. The three control signals VCTL1-3 control the antenna switch shown as a single-pole-3-throw switch (SP3T) to connect one of the multiple impedances Z1, Z2, Z3 to the antenna. For example, when Vin<Vref1, VCTL1=1, i.e. logic high, then the pole of the antenna switch SP3T is thrown to the first position P1 and the impedance Z1 is connected to the antenna; when Vref1<Vin<Vref2, VCTL2=1, i.e. logic high, then the pole of the antenna switch SP3T is thrown to the second position P2 and the impedance Z2 is connected to the antenna; when Vin>Vref2, VCTL3=1, i.e. logic high, then the pole of the antenna switch SP3T is thrown to the third position P3 and the impedance Z3 is connected to the antenna;

Z1, Z2 and Z3 may be selected as Za*, i.e. match to the antenna impedance, infinite i.e. open circuit, and 0, i.e. short circuit to the ground. According to Equation (1), the corresponding backscatter reflection coefficients are 0, −1 and 1 respectively.

The multiple subcarriers modulator 200 according to embodiments herein may be implemented in any backscatter device 110 as shown in FIG. 1. The multiple subcarriers modulator 200 generates backscattered signals for the antenna in the backscatter device 110 by applying the modulated signal to control the antenna switch. So the frequency of the backscattered signal shifts from carrier frequency $f_0$ by an offset of the summed signal (S1+S2) frequency. A hub device may then decode the backscattered signal by filtering out of its self-interference signal with frequency $f_0$.

Figure 5:
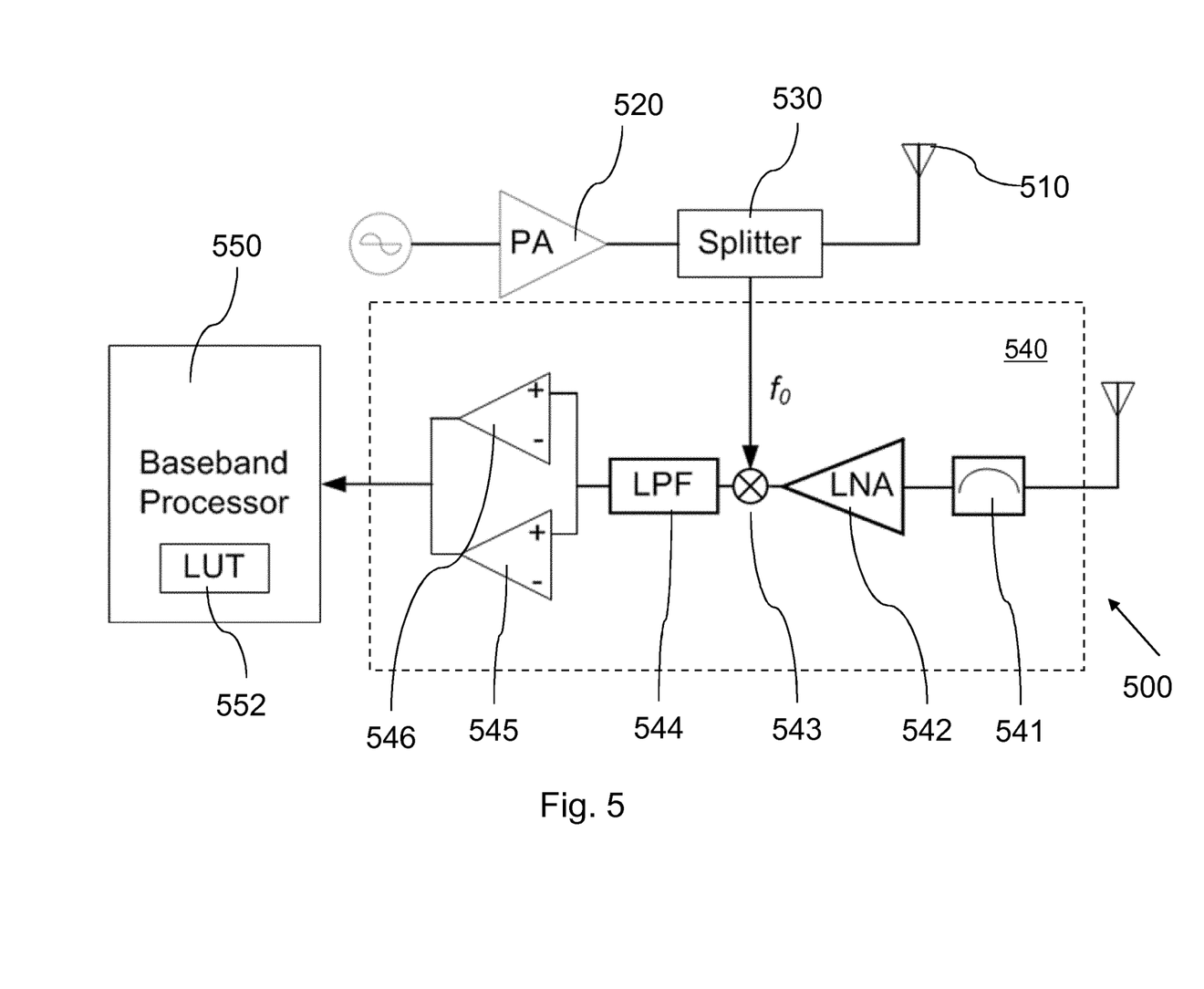
FIG. 5 is a schematic block diagram showing a hub device according to embodiments herein.

FIG. 5 shows a block diagram of a hub device 500 according to embodiments herein. The hub device 500 comprises an antenna 510 for sending or radiating RF signals, a power amplifier 520 for generating a signal with a carrier frequency $f_0$ for radiating by the antenna 510, and a power splitter 530 for splitting the carrier frequency signal.

The hub device 500 further comprises a receiver 540. The receiver 540 comprises a band-pass filter 541 configured to filter a backscattered signal received from a backscatter device 110 and generate a filtered signal. The backscattered signal comprises a first and a second data streams modulated on a first and second subcarriers respectively.

The receiver 540 further comprises an amplifier 542 configured to amplify the filtered signal and generate an amplified signal.

The receiver 540 further comprises a mixer 543 configured to down-convert the amplified signal to a baseband signal by mixing the amplified signal with a signal generated from the power splitter 530.

The receiver 540 further comprises a low-pass filter 544 configured to filter the baseband signal and generate a filtered baseband signal.

The receiver 540 further comprises two-comparators 545, 546 configured to extract bit streams from the filtered baseband signal.

The hub device 500 may further comprises a baseband processor 550 comprising a look-up table 552 to extract the first dada stream and the second data stream from the bit streams.

In operation, the receiver 540 receives the backscattered signal from a backscatter device. The signal is filtered and amplified by the band-pass filter 541 and the low-noise amplifier LNA 542. The output of the LNA 542 is then mixed with a signal with carrier frequency $f_0$ split from the carrier frequency signal and passed through the low-pass filter LPF 544. Following that, two comparators 545, 546 are used to extract bit stream from the filtered signal. The baseband processor 550 receives the bit stream, and uses the look-up table LUT 552 to extract the two data streams Data1 and Data2. The LUT 552 is shown in Table 1.

TABLE 1

| Rx bit stream | Data1 | Data2 |
| --- | --- | --- |
| 1 0 −1 1 | 1 | 0 |
| 0 1 1 −1 | 1 | 1 |
| 1 −1 0 1 | 0 | 1 |
| −1 1 1 0 | 0 | 0 |

The hub device 500 and the backscatter device 110 comprising the multiple subcarriers modulator 200 according to the embodiments herein may be implemented in a backscatter communication system 100 as shown in FIG. 1.

Figure 6:
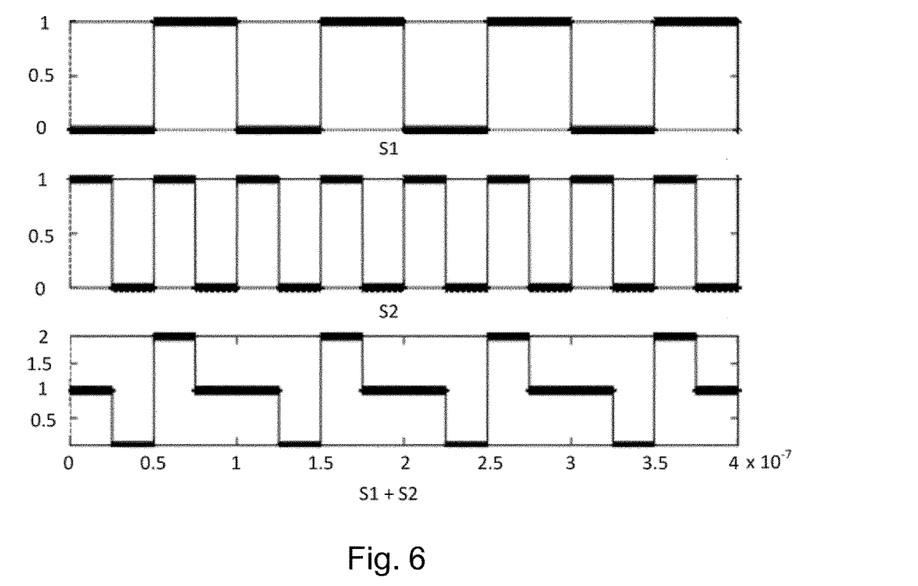
FIG. 6 are diagrams illustrating modulated signals according to embodiments herein.

Simulations have been performed on the backscatter communication system 100 with dual subcarriers according to the embodiments herein. In the simulations, the main carrier signal is transmitted from the hub device 120 with a frequency of 900 MHz, i.e. $f_0$=900 MHz. At the backscatter device 110, the 1st subcarrier frequency f1 is 10 MHz and the 2nd subcarrier frequency f2 is 20 MHz, the symbol duration is 0.4 us. Taking an example of Data1=1 and Data2=0, FIG. 6 shows the simulated waveforms of the modulated signal S1 and S2 and the sum of the two modulated signals S1+S2 during one symbol duration.

Figure 7:
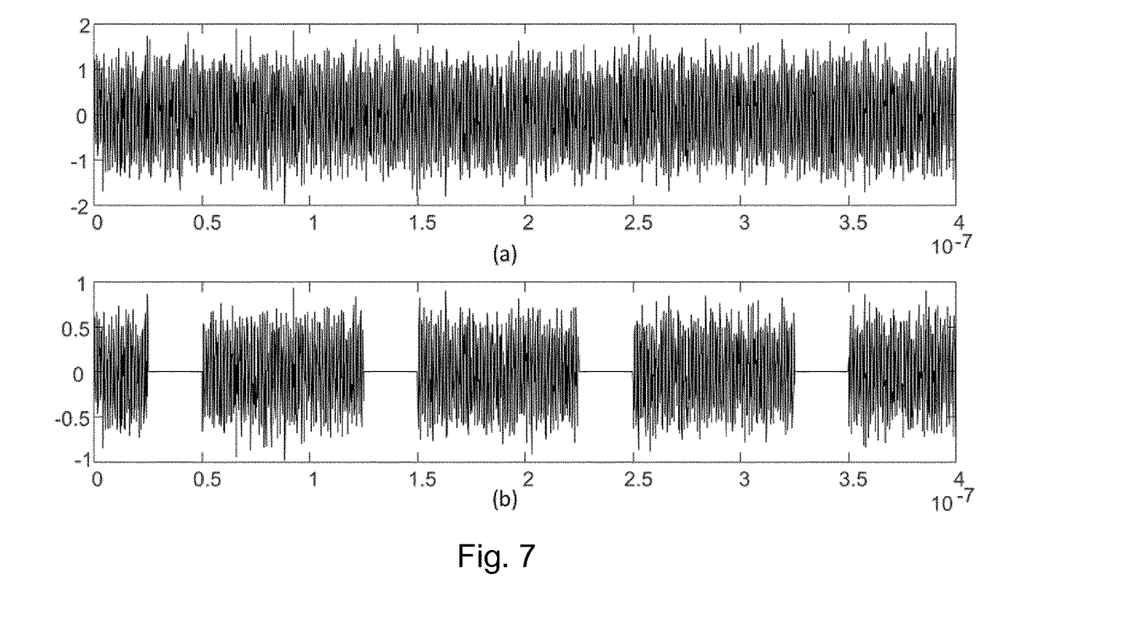
FIG. 7 are diagrams illustrating main carrier signal and backscattered signal according to embodiments herein.

The antenna switch 210 is controlled by the sum signal S1+S2 of the two modulated signals. When the voltage level of the sum signal is 0, the antenna shall be connected to Z1, i.e. antenna impedance is matched, no reflection; when the voltage level of the sum signal is 1, the antenna shall be open circuit, i.e. the antenna is connected to Z2; and when the voltage level of the sum signal is 2, the antenna shall be connected to the ground, i.e. to impedance Z3. FIG. 7 shows simulated signals in the backscatter device 110, where (a) is the incident sinusoidal signal with Gaussian white noise, i.e. the waveform of the main carrier and (b) is the backscattered signal with data modulated on two subcarriers.

Figure 8:
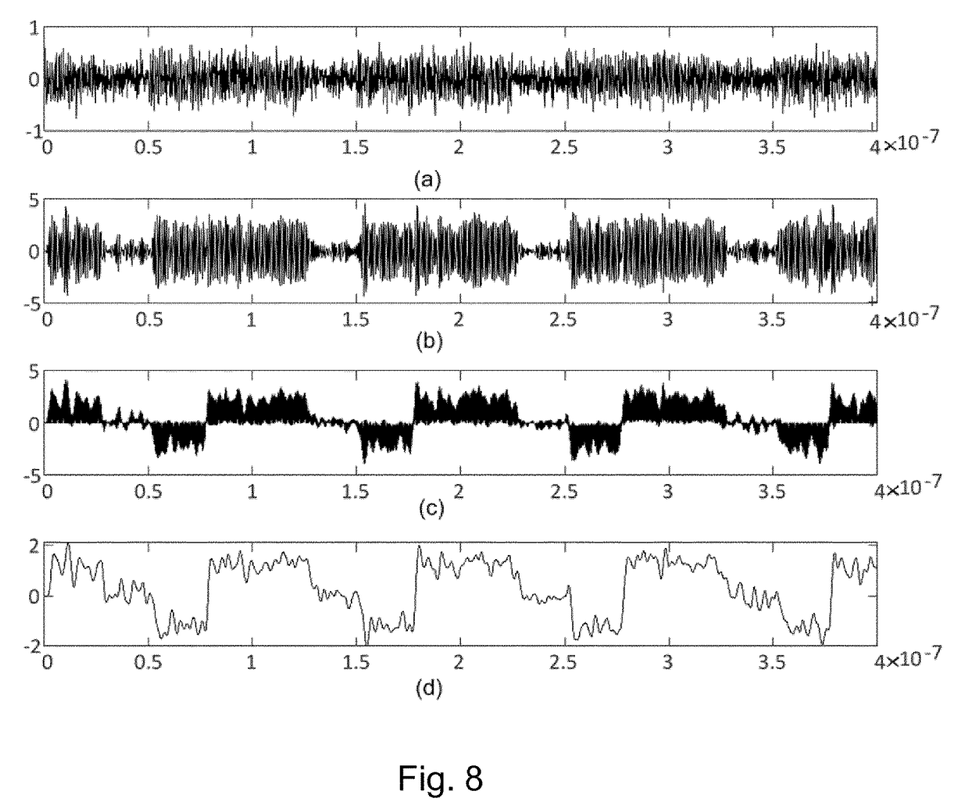
FIG. 8 are diagrams illustrating signals in a hub device according to embodiments herein.

On the hub device 120 side, the gain of the LNA 542 is assumed as 10 dB. FIG. 8 shows simulated waveforms of the received signal along the chain of the receiver 540 in the hub device 120, where (a) is the received signal at input of filter 541, (b) is the output signal of the LNA 542, (c) is the output signal of the mixer 543, and (d) is the output signal of the LPF 544. The baseband processor 550 shall read a bit line or stream of "1 0 −1 1, 1 0 −1 1, 1 0 −1 1, 1 0 −1 1" for one symbol from the comparators 545, 546. By looking up the LUT 552 shown in Table 1, the value of data in a symbol can be extracted as Data1="1" and Data2="0".

Figure 9:
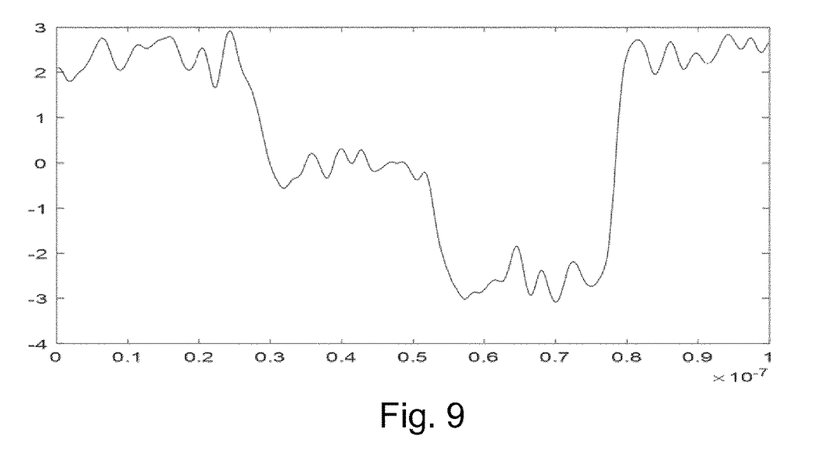
FIG. 9 is a diagram illustrating an averaged signal from a low pass filter in a hub device according to embodiments herein.

The comparators 545, 546 may be replaced by an analog-digital converter (ADC) so that the LPF 544 output signal is digitalized. As the data pattern repeats 4 times in each symbol, the digital signal may be averaged among the four repeated patterns. FIG. 9 shows an averaged signal of the LPF output. The average process may further improve receiver signal to noise ratio (SNR). The same LUT approach may be used to extract the two data streams.

To summarize, the embodiments herein provide a backscatter device 110 having data modulated with dual subcarriers to increase uplink throughput. The number of subcarriers may be further increased to more than two.

The embodiments herein also provide a hub device 120 to receive and demodulate the backscattered signals from the backscatter device 110. To simplify the demodulation process, a look-up table (LUT) approach is used.

The backscatter device 110 and hub device 120 may be implemented by simple circuits, such as using XOR gate as modulator, using a simple and small size LUT as demodulator. In this way, a low-power and low-cost communication system may be realized.

When using the word "comprise" or "comprising" it shall be interpreted as non-limiting, i.e. meaning "consist at least of".

The embodiments herein are not limited to the above described preferred embodiments. Various alternatives, modifications and equivalents may be used. Therefore, the above embodiments should not be taken as limiting the scope of the invention, which is defined by the appended claims.

The invention claimed is:

1. A multiple subcarriers modulator for a backscatter device comprised in a backscatter communication system, the multiple subcarriers modulator comprising:
   an antenna switch;
   an impedance matrix comprising a plurality of impedances;
   a first modulator configured to generate a first modulated signal by modulating a first data stream with a first subcarrier having a first frequency;
   a second modulator configured to generate a second modulated signal by modulating a second data stream with a second subcarrier having a second frequency;
   a summing circuit configured to generate a control signal by combining the first and second modulated signals; and
   a switch controller configured to control the antenna switch such that one of the impedances in the impedance matrix is connected to an antenna based on the control signal.

2. The multiple subcarriers modulator of claim 1, wherein each of the first and second modulators is an XOR gate.

3. The multiple subcarriers modulator of claim 1, wherein each of the first and second subcarriers is a square wave signal.

4. The multiple subcarriers modulator of claim 1, wherein the summing circuit is a summing amplifier comprising:
   an operational amplifier to sum the first and second modulated signals; and
   an inverter to invert the summed signal.

5. The multiple subcarriers modulator of claim 1, wherein the switch controller comprises multiple comparators configured to convert the control signal to switch signals for controlling on/off states of the antenna switch.

6. The multiple subcarriers modulator of claim 1, wherein the second frequency is two times of the first frequency.

7. The multiple subcarriers modulator of claim 1, further comprising a data split configured to split a data stream to be transmitted into the first and second data streams.

8. The multiple subcarriers modulator of claim 1:
   wherein each of the first and second modulators is an XOR gate;
   wherein each of the first and second subcarriers is a square wave signal.

9. The multiple subcarriers modulator of claim 1:
   wherein each of the first and second modulators is an XOR gate;
   wherein each of the first and second subcarriers is a square wave signal;
   wherein the summing circuit is a summing amplifier comprising:
      an operational amplifier to sum the first and second modulated signals; and
      an inverter to invert the summed signal.

10. The multiple subcarriers modulator of claim 1:
    wherein each of the first and second modulators is an XOR gate;
    wherein each of the first and second subcarriers is a square wave signal;
    wherein the summing circuit is a summing amplifier comprising:
       an operational amplifier to sum the first and second modulated signals; and
       an inverter to invert the summed signal;
    wherein the switch controller comprises multiple comparators configured to convert the control signal to switch signals for controlling on/off states of the antenna switch.

11. The multiple subcarriers modulator of claim 1:
    wherein each of the first and second modulators is an XOR gate;
    wherein each of the first and second subcarriers is a square wave signal;
    wherein the summing circuit is a summing amplifier comprising:
       an operational amplifier to sum the first and second modulated signals; and
       an inverter to invert the summed signal;
    wherein the switch controller comprises multiple comparators configured to convert the control signal to switch signals for controlling on/off states of the antenna switch;
    wherein the second frequency is two times of the first frequency.

12. The multiple subcarriers modulator of claim 1:
    wherein each of the first and second modulators is an XOR gate;
    wherein each of the first and second subcarriers is a square wave signal;
    wherein the summing circuit is a summing amplifier comprising:
       an operational amplifier to sum the first and second modulated signals; and
       an inverter to invert the summed signal;
    wherein the switch controller comprises multiple comparators configured to convert the control signal to switch signals for controlling on/off states of the antenna switch;
    wherein the second frequency is two times of the first frequency;
    further comprising a data split configured to split a data stream to be transmitted into the first and second data streams.

13. A backscatter device, comprising:
    a multiple subcarriers modulator, the multiple subcarriers modulator comprising:
       an antenna switch;
       an impedance matrix comprising a plurality of impedances;
       a first modulator configured to generate a first modulated signal by modulating a first data stream with a first subcarrier having a first frequency;
       a second modulator configured to generate a second modulated signal by modulating a second data stream with a second subcarrier having a second frequency;
       a summing circuit configured to generate a control signal by combining the first and second modulated signals; and a switch controller configured to control the antenna switch such that one of the impedances in the impedance matrix is connected to an antenna based on the control signal.

14. A hub device comprised in a backscatter communication system, the hub device comprising:
an antenna;
a power amplifier for generating a carrier frequency signal with a carrier frequency for radiating by the antenna;
a power splitter for splitting the carrier frequency signal; and
a receiver, wherein the receiver comprises:
a band-pass filter configured to filter a backscattered signal received from a backscatter device and generate a filtered signal, wherein the backscattered signal comprises a first and a second data streams modulated on a first and second subcarriers respectively;
an amplifier configured to amplify the filtered signal and generate an amplified signal;
a mixer configured to down-convert the amplified signal to a baseband signal by mixing the amplified signal with a signal generated from the power splitter;
a low-pass filter configured to filter the baseband signal and generate a filtered baseband signal;
two-comparators configured to extract bit streams from the filtered baseband signal; and
a baseband processor comprising a look-up table to extract the first data stream and the second data stream from the bit streams.

15. A backscatter communication system, comprising:
a hub device of claim; and
a backscatter device;
wherein the hub device comprises:
an antenna;
a power amplifier for generating a carrier frequency signal with a carrier frequency for radiating by the antenna;
a power splitter for splitting the carrier frequency signal; and
a receiver, wherein the receiver comprises:
a band-pass filter configured to filter a backscattered signal received from a backscatter device and generate a filtered signal, wherein the backscattered signal comprises a first and a second data streams modulated on a first and second subcarriers respectively;
an amplifier configured to amplify the filtered signal and generate an amplified signal;
a mixer configured to down-convert the amplified signal to a baseband signal by mixing the amplified signal with a signal generated from the power splitter;
a low-pass filter configured to filter the baseband signal and generate a filtered baseband signal;
two-comparators configured to extract bit streams from the filtered baseband signal; and
a baseband processor comprising a look-up table to extract the first data stream and the second data stream from the bit streams;
wherein the backscatter device comprises a multiple subcarriers modulator, the multiple subcarriers modulator comprising:
an antenna switch;
an impedance matrix comprising a plurality of impedances;
a first modulator configured to generate a first modulated signal by modulating a first data stream with a first subcarrier having a first frequency;
a second modulator configured to generate a second modulated signal by modulating a second data stream with a second subcarrier having a second frequency;
a summing circuit configured to generate a control signal by combining the first and second modulated signals; and
a switch controller configured to control the antenna switch such that one of the impedances in the impedance matrix is connected to an antenna based on the control signal.

* * * * *